(12) United States Patent
Böse et al.

(10) Patent No.: US 8,205,728 B2
(45) Date of Patent: Jun. 26, 2012

(54) MAGNETORHEOLOGICAL FORCE TRANSMISSION DEVICE

(75) Inventors: Holger Böse, Würzburg (DE); Johannes Ehrlich, Wiesenbronn (DE); Patrick Meneroud, Vif (FR); Gregory Magnac, Saint Martin d'Heres (FR)

(73) Assignee: Fraunhofer-Gesellschaft zur Förderung der angewandten Forschung E.V., München (DE)

( * ) Notice: Subject to any disclaimer, the term of this patent is extended or adjusted under 35 U.S.C. 154(b) by 758 days.

(21) Appl. No.: 12/276,883

(22) Filed: Nov. 24, 2008

(65) Prior Publication Data

US 2009/0133976 A1    May 28, 2009

(30) Foreign Application Priority Data

Nov. 28, 2007   (EP) ..................... 07023063

(51) Int. Cl.
*F16F 9/53*    (2006.01)
(52) U.S. Cl. ..................... 188/267; 188/267.2
(58) Field of Classification Search .................. 188/267, 188/267.1, 267.2
See application file for complete search history.

(56) References Cited

U.S. PATENT DOCUMENTS

| | | | |
|---|---|---|---|
| 5,263,558 A * | 11/1993 | Yamaoka ..................... 188/267 |
| 5,293,969 A * | 3/1994 | Yamaoka et al. .......... 188/266.5 |
| 5,632,361 A | 5/1997 | Wulff |
| 5,947,238 A * | 9/1999 | Jolly et al. ................. 188/267.2 |
| 6,328,369 B1 * | 12/2001 | Nagai ......................... 296/95.1 |
| 6,390,252 B1 * | 5/2002 | Namuduri et al. ......... 188/267.2 |
| 6,427,813 B1 | 8/2002 | Carlson |
| 6,722,480 B2 * | 4/2004 | Carlson ..................... 188/267.2 |
| 6,866,127 B2 * | 3/2005 | Nehl et al. ................. 188/266.1 |
| 8,016,087 B2 * | 9/2011 | Murakami et al. ........... 188/267 |
| 2004/0262106 A1 | 12/2004 | Manecke |
| 2006/0016649 A1 | 1/2006 | Gordaninejad |
| 2007/0193839 A1 * | 8/2007 | Nakajima et al. ......... 188/267.2 |

FOREIGN PATENT DOCUMENTS

| | | |
|---|---|---|
| DE | 10143980 A1 | 3/2003 |
| EP | 1270988 B1 | 1/2003 |
| GB | 675352 A | 7/1952 |
| JP | 63259235 A | 10/1988 |

* cited by examiner

*Primary Examiner* — Christopher Schwartz
(74) *Attorney, Agent, or Firm* — Matthew B. Dernier, Esq.; Gibson & Dernier LLP (57) ABSTRACT

The present invention discloses a magnetorheological force transmission device which comprises at least two solid body parts adapted to be moved in a substantially translational manner against each other, and an MRF gap, which is at least partially fillable and/or filled with a magnetorheological material 2MRF, the MRF gap being arranged at least partially inside one of or both of the two parts and/or being arranged at least partially in-between the two parts, and which is characterized in that the magnetic circuit system of the magnetorheological force transmission device being designed and/or disposed to generate a magnetic flux within at least part of the MRF gap comprises at least one electromagnet, at least one permanent magnet and at least one magnetic-field-balancing insert and/or magnetic isolator.

22 Claims, 9 Drawing Sheets

MAGNETORHEOLOGICAL FORCE TRANSMISSION DEVICE

BACKGROUND

The present invention relates to a magnetorheological force transmission device and to several embodiments thereof, e.g. in form of dampers, locking devices, blocking devices and safety switches as well as to uses thereof and to magnetorheological force transmission methods.

Magnetorheological force transmission devices are already known, see e.g. EP 1 270 988 B1 or DE 101 43 980 A1. The known magnetorheological force transmission devices generate the magnetic field based on electromagnets in the form of coils. Magnetorheological force transmission devices of this kind, however, have the disadvantage that when the energy supply fails, the device (especially in form of a damper) adopts a state of minimum damping force. This means that the known devices do not show an advantageous fail-safe behavior.

SUMMARY OF THE INVENTION

It is thus one object of the present invention to provide magnetorheological force transmission devices which provide a larger degree of freedom with respect to the choice of the magnetic operating point and which allow a better fail-safe behavior as the known magnetorheological force transmission devices.

The objectives of present invention are solved by the embodiments of the magnetorheological force transmission device as shown and described herein. Advantageous modifications of the present invention can be achieved using the further features as shown and described herein. Uses according to the present invention are shown and described herein. A magnetorheological force transmission method according to one or more embodiments of the present invention is described herein.

Below, the present invention will now be described firstly in general form. This general description is then followed by two concrete examples describing advantageous embodiments of the present invention.

Therein, particular features according to the present invention cannot only be realized in a combination which is shown in the concrete examples described later, but also (within the scope of present invention) in arbitrary combinations according to the skills of the one skilled.

One gist of the solution of the above objectives of the present invention is that within the magnetorheological force transmission device according to the invention, wherein two solid body parts adapted to be moved in a substantially translational manner against each other (e.g. two nested pistons) and wherein a Magnetorheological-Fluid gap (hereinafter abbreviated: MRF gap), which is at least partially filled with a magnetorheological material (especially a magnetorheological fluid, thus thereafter also abbreviated as "MRF") and which is arranged at least partially inside one of or both of the two parts and/or in-between the two parts, are provided, a magnetic circuit system of the magnetorheological force transmission device is provided which is designed and/or disposed such that the magnetic flux within the MRF gap is generated with at least one electromagnet, at least one permanent magnet and at least one magnetic-field-balancing insert and/or one magnetic isolator. Advantageously, three magnets, either one permanent magnet and two electromagnets (the electromagnets comprising coils) or two permanent magnets and one electromagnet are used to generate said magnetic flux, i.e. to adjust the magnetic operating point of the magnetorheological force transmission device. Therein, the magnetic operating point determines the basic magnetic field when the current through the coil or the coils of the electromagnet(s) is interrupted or switched off. Hereinafter, those parts of the MRF gap in which the viscosity of the MRF can be changed (i.e. those parts of the MRF gap through which magnetic flux lines essentially flow or can flow) are called active MRF gaps. In other words: The active MRF gap or the active MRF gaps is/are part of the whole MRF gap (in the most extreme case the "active" parts can be identical with the entire MRF gap).

Within the present invention, magnetorheological materials, especially magnetorheological fluids (MRF), are suspensions of magnetic polarizable particles in a carrier liquid, wherein the viscosity and other Theological features of the MRF can be changed reversibly and with a high velocity in an external magnetic field. Consequently, such MRF constitute an ideal basis for adaptive magnetorheological force transmission devices such as for example dampers, wherein the force to be transmitted through the active MRF gap can be controlled with help of altering the strength of the external magnetic field. For example within a damper, there can be arranged two nested pistons with an MRF gap filled with the MRF arranged between the two pistons or with the MRF gap arranged inside one of the pistons and, when changing the magnetic field passing through the MRF gap in its strength, the damping force of the damper can be changed. In the most extreme case, when the strength of the external magnetic field is high enough, the whole system can be blocked. Thus, the forces transmitted can be controlled with help of the external magnetic field. For example the resistance force applied to a piston which is moved in a nested manner within another piston (or hollow cylinder) is altered when the flow resistance of the MRF during the flow through an opening within the piston is changed with help of the magnetic field.

Within the present invention a magnetic circuit system is defined as follows: The magnetic circuit system consists of the sum of all single magnetic circuits of the magnetorheological force transmission device. Beyond this, this expression is also used for the sum of all single constructive elements (e.g. coils, permanent magnets, magnetic-field-balancing inserts, magnetic isolators or non-magnetic inserts, magnetic flux guiding elements or Yoke-parts (e.g. consisting of iron) . . . ) which belong to the single magnetic circuits or form these, respectively. What is meant in each case, is clear for the one skilled when considering the respective context. Within the present invention, a single magnetic circuit, which, together with the other magnetic circuits, forms the magnetic circuit system (which, within present invention, means a defined area or volume in space, which is superposed by or guides the closed magnetic flux lines of a magnetic field generator (permanent magnet or electromagnet)). This defined area or volume in space can also be superposed by the closed magnetic flux lines of plural magnetic field generators (the closed magnetic flux lines of the plural magnetic field generators are then preferably arranged essentially parallel to each other). Therein, it is also possible that the magnetic flux lines of another magnetic field generator which does not belong to the specified magnetic circuit, but belongs to another magnetic circuit are partially also arranged in this defined area or volume in space. The definition of a magnetic circuit relates to a defined operational state of the whole system (especially a defined current direction within the coil or the coils of an electromagnet or of the electromagnets or a defined polarization orientation of the permanent magnet or the permanent magnets): It is consequently not excluded that, when another operational state of the same corporeal arrangement and of the same corporeal form of the single elements (permanent magnets, electromagnets, magnetic-field-balancing inserts, . . . ) constituting the system is given, another magnetic circuit system is formed. Thus, when an expression as for example "the electromagnet is arranged (or is disposed) in a magnetic circuit without the permanent magnet" is used, this only means that within one of the plural possible operational states (e.g. depending upon the direction of the current in the coil of the electromagnet) the specific magnetic circuit comprising the electromagnet does not also comprise the permanent magnet, without, however, excluding that in the other operational state the specific magnetic circuit also comprises the permanent magnet. Beyond this, the expression of the "magnetic circuit" also comprises all those constructive elements or parts thereof (e.g. coils, ferromagnetic flux guiding parts, which for example can be formed as yoke parts, non-magnetic elements, . . . ) of the magnetorheological force transmission device which are superposed, embedded and/or surrounded by the magnetic flux lines of the specified magnetic field generator(s) or which guide the magnetic flux lines.

Within the present invention in its most general form, a magnetic-field-balancing insert comprises a three-dimensional area or volume in space, which is filled by one material or plural materials as follows: A non-magnetic material, such as for example an air-filled volume or an aluminum solid state body, a diamagnetic material and/or a ferromagnetic material with a small relative magnetic permeability $\mu_r$ of smaller than 10, i.e. a ferromagnetic material with a relative magnetic permeability, which is much smaller than that of iron. Magnetic isolators are preferably constituted analogously.

Whereas in the magnetorheological force transmission devices according to the state of the art the magnetic field is normally generated by a current flowing through a coil of an electromagnet and guided with help of the magnetic circuit into the MRF gap (comprising the active gap parts) wherein in the active gap parts the MRF will be stiffened due to the influence of the magnetic field (such known force transmission devices apply without any current in the coil only a small damping force—smooth damping—whereas with an increasing current the damping force also increases—hard damping), in the magnetorheological force transmission device according to the present invention a magnetic base field can be generated also without any current within the coil of the electromagnet due to the use of at least one permanent magnet. Consequently, by the additional current in the coil, the magnetic field can be, dependent upon the direction of the current in the coil or in the coils, either be increased or be decreased. Due to the magnetic base field, the permanent magnet alone generates a basic damping without any electric energy input. Therefore, a fail-safe behavior can be secured also for a case in which the electric energy supply fails. The present invention thus describes magnetorheological force transmission devices in which the selection of the magnetic operating point (which is the magnetic flux density within the MRF gap without power supply) is possible over a very broad range by the design of the magnetic circuits including electromagnets, permanent magnets, magnetic-field-balancing inserts and magnetic isolators and consequently a large variation of the magnetic flux density in the active MRF gap (parts) down to nearly zero can be realized by the electromagnets, i.e. the current in the coils.

Consequently, the resistance force of the device, which can be attained without any energy input, can be controlled over a very broad range and very small minimum forces as well as a high variability of the force can be attained due to the current within the coil.

In order to do so, the magnetorheological force transmission device according to the present invention comprises a magnetic circuit system which comprises at least one electromagnet (coil), at least one permanent magnet and at least one magnetic-field-balancing insert and/or one magnetic isolator. By an appropriate selection of the magnetic-field-balancing insert and/or one magnetic isolator (especially a non-magnetic insert) or corresponding inserts, the magnetic flux density in the active MRF gap can be set to a desired value for the case in which no current flows through the coil or the coils, respectively.

Preferably, the magnetic circuit system of the magnetorheological force transmission device comprises 2S-1 electromagnets and 2P permanent magnets or 2S electromagnets and 2P-1 permanent magnets, wherein S=1, 2, 3, . . . and P=1, 2, 3, . . . and wherein preferably S=P.

In an advantageous embodiment, the magnetorheological force transmission device according to the invention comprises at least two active MRF gaps (wherein it is possible to provide an inter-connection between the different active MRF gaps). Beyond this, advantageously a symmetrical arrangement of the electromagnet(s) and the permanent magnet(s) along a straight line is provided. Thus, in a case of two electromagnets and one permanent magnet for example or one electromagnet and two permanent magnets, the one electromagnet or the one permanent magnet is advantageously disposed in-between the two permanent magnets or the two electromagnets, respectively (i.e. the one magnet is arranged in a sandwiched form between the other two magnets of the other magnet type). In the latter case, the magnetic flux guidance consists of three separate magnetic circuits. In such a magnetic circuit system (it is now for the rest of this passage assumed that the system comprises one electromagnet and two permanent magnets and two active MRF gaps) the magnetic flux generated by the one electromagnet essentially flows through the active MRF gaps and not through the permanent magnets (which is described in detail below), so that the danger of a depolarization of the permanent magnets is avoided. In addition, the magnetic flux of each of the two permanent magnets exclusively flows through only one respective active MRF gap so that a higher magnetic flux density is generated when compared to the case of the flowing of the magnetic flux through plural active MRF gaps.

Alternatively, a part of the MRF gap can be provided with a larger diameter or with a widened section so that the mechanical resistance of the damper in the case of the smallest magnetic field strength (permanent magnets and the electromagnet are compensating each other optimally) is decreased so that the switching factor of the force transmission device (which is the damping force in the case of the maximum field strength in relation to the damping force at the minimum field strength) is noticeably increased.

In an another advantageous embodiment, the MRF gap is arranged at least partially in-between two solid body parts and the two solid body parts are adapted to be moved one relative to the other in a substantially shearing manner. In a substantially shearing manner means that the two solid body parts comprise one surface each, wherein the said two surfaces of the two solid body parts are arranged substantially in parallel one to the other (with the MRF gap arranged at least partially in-between these two surfaces), and that one of the surfaces is moved relative to the other in a direction substantially in parallel to the two surfaces, thus shearing the MRF in the MRF-gap in-between the two surfaces. In still a further advantageous embodiment, the MRF gap is arranged at least partially in-between two solid body parts and the two solid body parts are adapted to be moved one relative to the other in a substantially squeezing manner. In a substantially squeezing manner means that the two solid body parts comprise one surface each, wherein the said two surfaces of the two solid body parts are arranged substantially in parallel one to the other (with the MRF gap arranged at least partially in-between these two surfaces), and that one of the surfaces is moved relative to the other in a direction substantially perpendicular to the two surfaces, thus squeezing the MRF in the MRF-gap in-between the two surfaces.

In further embodiments of the present invention, instead of using a magnetorheologic fluid (MRF), a magnetorheologic gel (MRG), a magnetorheologic elastomer (MRE) or a magnetorheologic foam (MRFO) can be used. A magnetorheologic gel is a material which in contrast to an MRF is soft, but not provided in form of a liquid. In analogy of an MRF, such a MRG can be arbitrarily deformed and can be stiffened in a magnetic field. A MRE is a cross-linked material which therefore has a predetermined form which can be deformed out of this form only mined form which can be deformed out of this form only in certain limits and stiffened. An MRFO is an elastomer foam wherein the pores of the foam are filled with an MRF. Like a MRE, also the MRFO has a predetermined shape out of which it can be reversibly deformed only within certain limits and stiffenend.

Possible applications of the magnetorheological force transmission device according to the present invention are electrically controllable dampers, especially vibration dampers and shock absorbers, wherein the damping force can be altered with help of the magnetic field generated by the coil or the coils, respectively. Because of the use of the permanent magnet or the permanent magnets, and of the magnetic-field-balancing insert(s) and/or one magnetic isolator(s) a desired basic force can be set without any current flowing through the coil(s) in order to attain a specific fail-safe behavior. Further applications are locking devices or blocking devices. Therein, a blocking force can be generated without applying any electrical energy and the blocking force can be compensated with help of the coil current. This can especially be used in order to realize safety switches. Beyond this, the device according to the present invention can also be realized as a haptic device or as a man machine interface, respectively. Therein, a basic force, which can clearly be sensed by a user, can be generated with help of the permanent magnet(s) and this force can be increased or decreased with help of the electromagnet(s).

DETAILED DESCRIPTION OF THE INVENTION

Figure 1A:
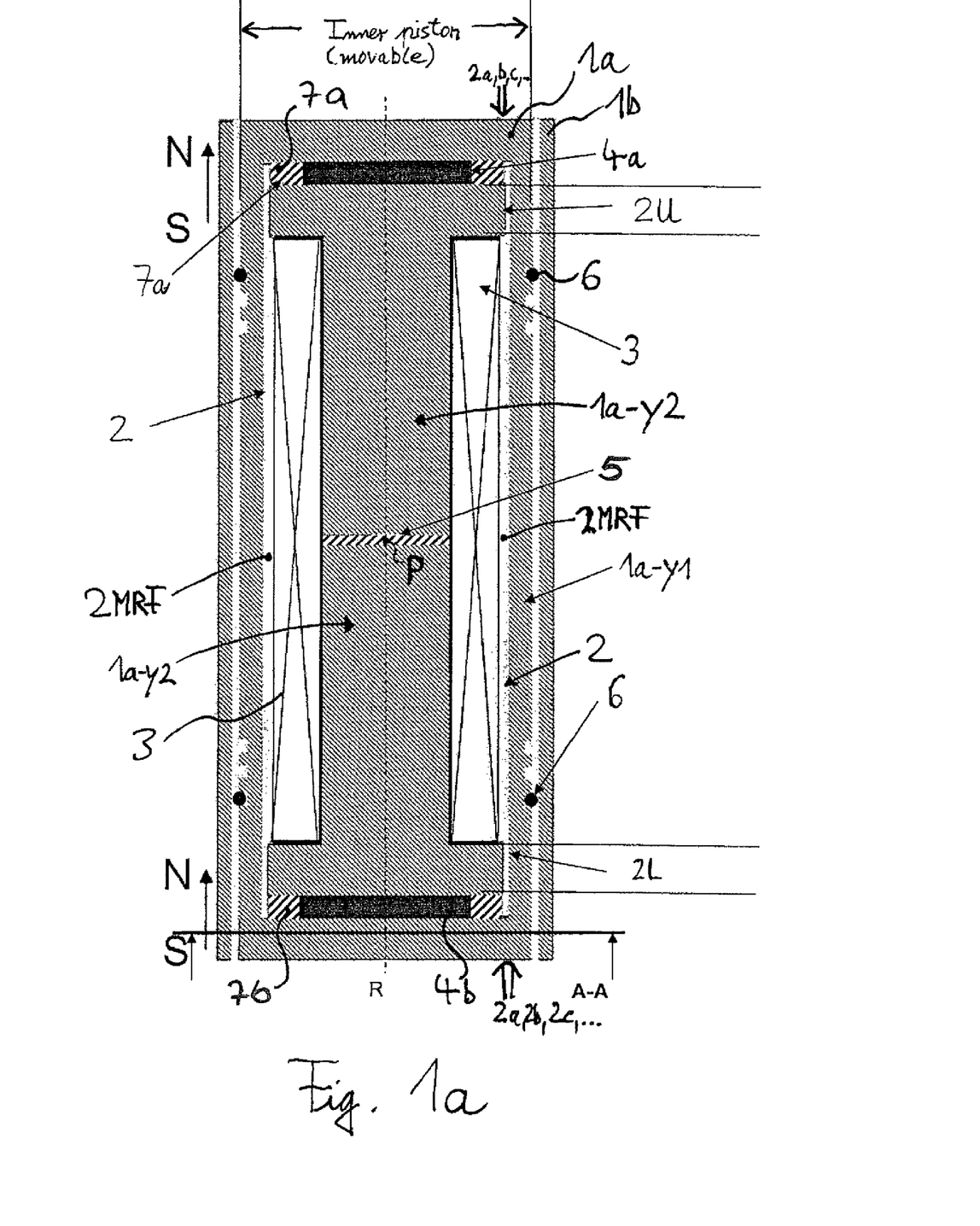
FIGS. 1a to 1e illustrate various views of a first embodiment of the present invention.
Figure 1B:
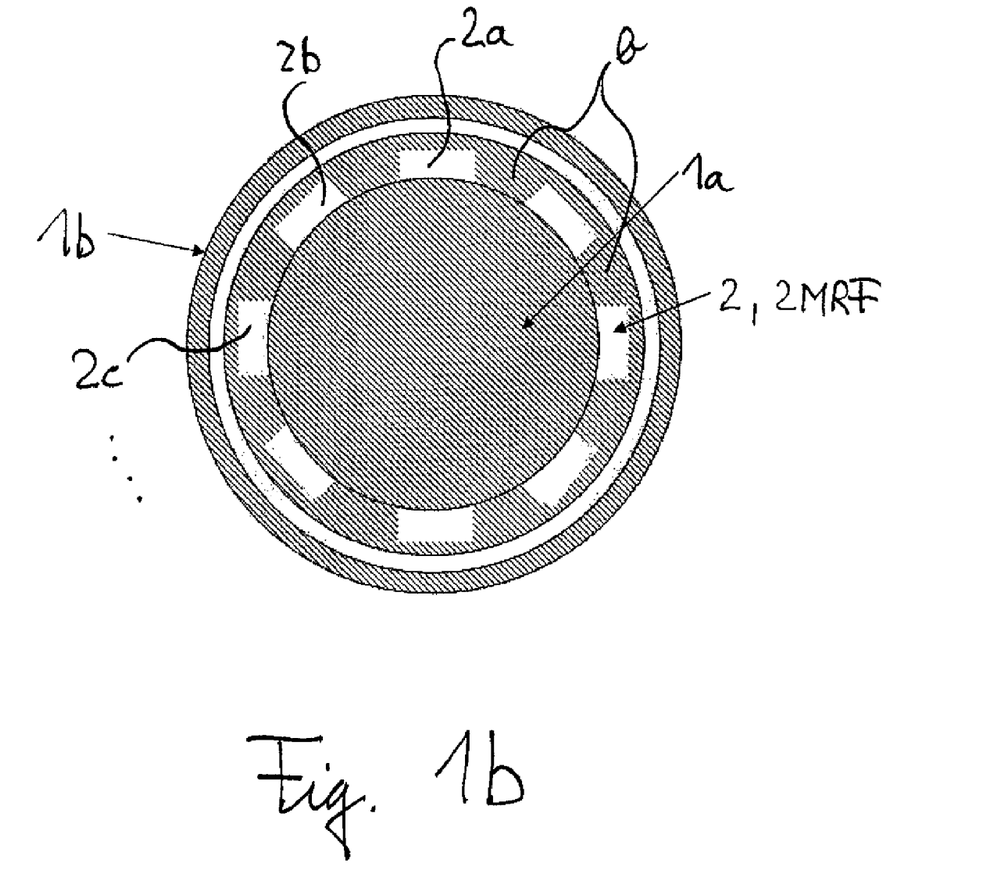

FIG. 1a shows a sectional view (through the central, longitudinal axis of the shown device) of a magnetorheological force transmission device according to the present invention, which constitutes a shock absorber. FIG. 1b shows a cross-section through the shown device along the direction A-A in FIG. 1a, i.e. perpendicular to the axis R. Basically, the shown damper comprises two piston elements: A first piston element 1a, essentially formed in form of a cylinder, which is inserted or nested in a second piston element 1b, which is formed as a hollow cylinder in which the first piston element 1a can be introduced along the longitudinal symmetry axis R of the shown device. Thus, both pistons are adapted to be moved one relative to the other in a translational manner along a common line, wherein said line is arranged essentially in parallel to the common longitudinal axis R of the two pistons or equals this common axis. The part 1a is thus slideably movable within the part 1b. Both parts 1a and 1b are essentially formed by a ferromagnetic material, in this case iron. On its outer periphery, the inner piston 1a comprises an outer yoke part 1a-y1 and the inner section (i.e. the section which is arranged in the area of the central axis R and around the central axis R within the outer yoke part 1a-y1) is formed as an inner yoke part 1a-y2. The gap between the part 1a and the part 1b comprises in an upper portion and in a lower portion ring-shaped sealing elements 6 of which the diameter corresponds to the outer diameter of the inner piston 1a. Thus, the parts 1a and 1b are inserted into one another in a sealed condition. By applying a force along the direction R onto the inner piston 1a, the inner piston 1a is moved relative to the outer piston 1b along the line R in a manner which is later described in more detail (i.e. in a manner dependent upon the stiffness of the magnetorheological material 2MRF).

Seen along the central axis R, the inner piston 1a contains three different sections or areas, in which three different separated magnetic circuits are formed (see below): In a first, central section along the axis R, there is provided in the inner yoke part 1a-y2 a magnetic-field-balancing insert 5 (here formed of aluminum and shaped in form of a flat disk which is arranged perpendicular to the axis R). On the outer circumference of said disk 5 the coil of an electromagnet 3 is disposed. Thus, the inner radius of the hollow-cylinder-shaped Thus, the inner radius of the hollow-cylinder-shaped electromagnet 3 (the symmetry axis of the hollow cylinder corresponds to the axis R), therefore equals the outer radius of the disk of the magnetic-field-balancing insert 5 so that the inner yoke part 1a-y2 is completely separated by the disk 5 into an upper part and into a lower part along the axis R in a symmetric arrangement. This complete separation of the inner yoke part 1a-y2 is an essential aspect of the present invention as then essentially each magnetic flux line of the second magnetic circuit M2 (to be described later) has to pass through that separating disk 5: Consequently, the magnetic-field-balancing insert 5 in-between the electromagnet 3 is arranged thus that the magnetic flux lines of the two permanent magnets 4a and 4b (to be described later) are not short-circuited.

Alternatively, instead of providing a disk 5 separating the inner yoke part 1a-y2, a ring-shaped magnetic-field-balancing insert (not shown) can be provided which completely separates the outer yoke part 1a-y1 into symmetric parts along the axis R. Also such an arrangement provides a complete separation in such a manner that each magnetic flux line of the second magnetic circuit M2 has to pass through a part of the magnetic-field-balancing insert. Thus, at least one of the magnetic-field-balancing inserts 5 is either arranged centrically, preferably essentially in the shape of a disk, on said line R or concentrically, preferably essentially in the shape of a hollow-cylinder, a torus or a circular ring, around said line.

On both sides of the central electromagnet 3, two permanent magnets 4a and 4b along the axis R are arranged: A first permanent magnet 4a in form of a flat disk which is arranged in the upper section of the piston 1a (near the upper end of said piston), centered around the axis R and perpendicular to said axis and a second permanent magnet 4b shaped as the first permanent magnet 4a and arranged perpendicular to the axis R at the lower end section of the piston 1a. Each of the permanent magnets 4a and 4b is surrounded by one non-magnetic insert formed out of aluminum (magnetic isolators 7a and 7b). Each of the magnetic isolators 7a and 7b is formed as a flat ring, whose inner diameter corresponds to the outer diameter of the corresponding permanent magnet 4a and 4b. Each permanent magnet 4a, 4b is arranged at the same position (seen along the axis R) as its corresponding magnetic isolator 7a, 7b. The permanent magnets 4a, 4b are made of a hard-magnetic material like NdFeB. Both permanent magnets 4a, 4b are arranged thus that their magnetic field lines flow in parallel (i.e. identical arrangement of their respective north-south orientation (NS)).

The shown inner piston 1a is provided with an MRF gap 2 which extends around the whole circumference of the inner piston 1a at a radius distance from the axis R which approximately corresponds to the outer diameter of the magnetic isolators 7a and 7b or the outer diameter of the hollow cylinder-shaped electromagnet 3. The MRF gap 2 extends nearly along the whole length of the inner piston 1a (seen in direction of the axis R) except for the upper end part and the lower end part of the inner piston 1a (these are the parts which extend, seen from the central point P of the symmetric system arrangement, above the elements 4a/7a and below the elements 4b/7b). In these outer sections, the piston 1a is provided, see FIG. 1b, with a plurality of outlets 2a, 2b, 2c, ... connected to the MRF gap 2 or being part of the latter, respectively, and being arranged circumferentially at a distance from the axis R, which approximately corresponds to the distance of the MRF gap 2 from said axis R. Thus, the outlets 2a, 2b, 2c, ... and the MRF gap 2 are arranged along the axis R in such a manner that a magnetorheological fluid 2MRF can flow through the channels 2, 2a, 2b, 2c, ... along the axis R. The MRF gap 2 is arranged essentially in parallel to the common longitudinal axis of the two pistons.

The magnetic isolators (7a, 7b) are used to increase the field due to the permanent magnets (pm) in the 2U/2L valve. They are preferably as large as possible to improve the generation of the field by permanent magnets (pm) and to avoid/reduce pm field short circuit. To even improve this function, enlarged inserts 7a, 7b could be used. In the opposite of magnetic-field-balancing insert 5, assuming the 2U/2L valve length is the same, the coil field is not modified by their design.

The design of magnetic balancing insert 5 is a matter of compromise and realizes the idea of the invention. For a given number of Ampere-turns in the coil, Increasing the insert 5 thickness increases permanent magnets (pm) field in the 2U and 2L valves but decreases the coil fields in the 2U and 2L valves: So if the insert 5 thickness is increased too much, the coil cannot cancel the pm field in the 2U and 2L valves.

Decreasing the insert 5 thickness decreases permanent magnets (pm) field in the 2U and 2L valves but increases the coil fields in the 2U and 2L valves: So if insert 5 thickness is decreased too much, the flux density of the permanent magnets is too small in the 2U and 2L valves to solidify the MRF and to get the blocking effect.

So modifying insert 5 allows balancing coil field vs. pm field in the valves. For this reason, insert 5 has not the same role as 7a and 7b.

As can be seen from FIG. 1a, the magnetorheological force transmission device shown provides a mirror-symmetric arrangement of its elements seen along the axis R or a plane through the point P perpendicular to said axis R, respectively, and a rotational-symmetric arrangement around the axis R (rotational-symmetric except for elements 2a, 2b, 2c, ... ).

Thus, as is described later in detail, when filling the channel parts 2, 2a, 2b, 2c, ... with the magnetorheological fluid 2MRF, the arrangement of the upper permanent magnet 4a together with its corresponding magnetic isolator 7a provides together with the corresponding upper active MRF gap part 2U a first, upper MRF valve whereas the lower arrangement of the elements 4b, 7b together with the corresponding lower, active part 2L of the MRF gap provides a second, lower MRF valve. Thus, due to the magnetic flux in said valves or generated by the permanent magnets 4, respectively, as is described in more detail later, a certain basic stiffening of the MRF in the corresponding sections 2U, 2L of the MRF gap 2 results in a basic damping of the shown device also in the case when there is no current flowing through the coil of the electromagnet 3. When selecting the appropriate current direction through the coil of the electromagnet 3, by increasing said current, the magnetic flux through the active parts 2U, 2L of the MRF gap 2 can be increased, thus increasing the damping of the whole device (see FIG. 1d).

Figure 1C:
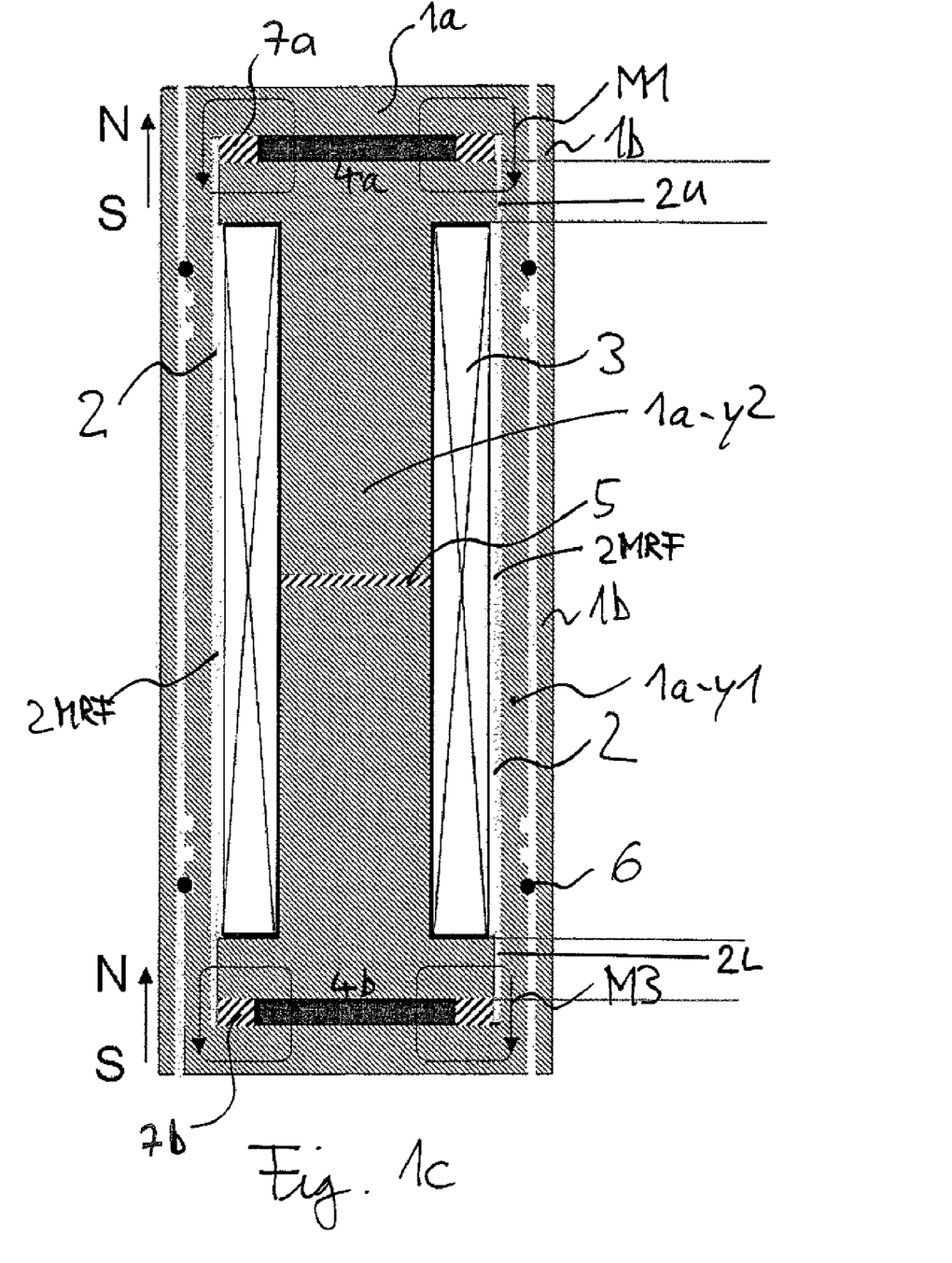
Figure 1D:
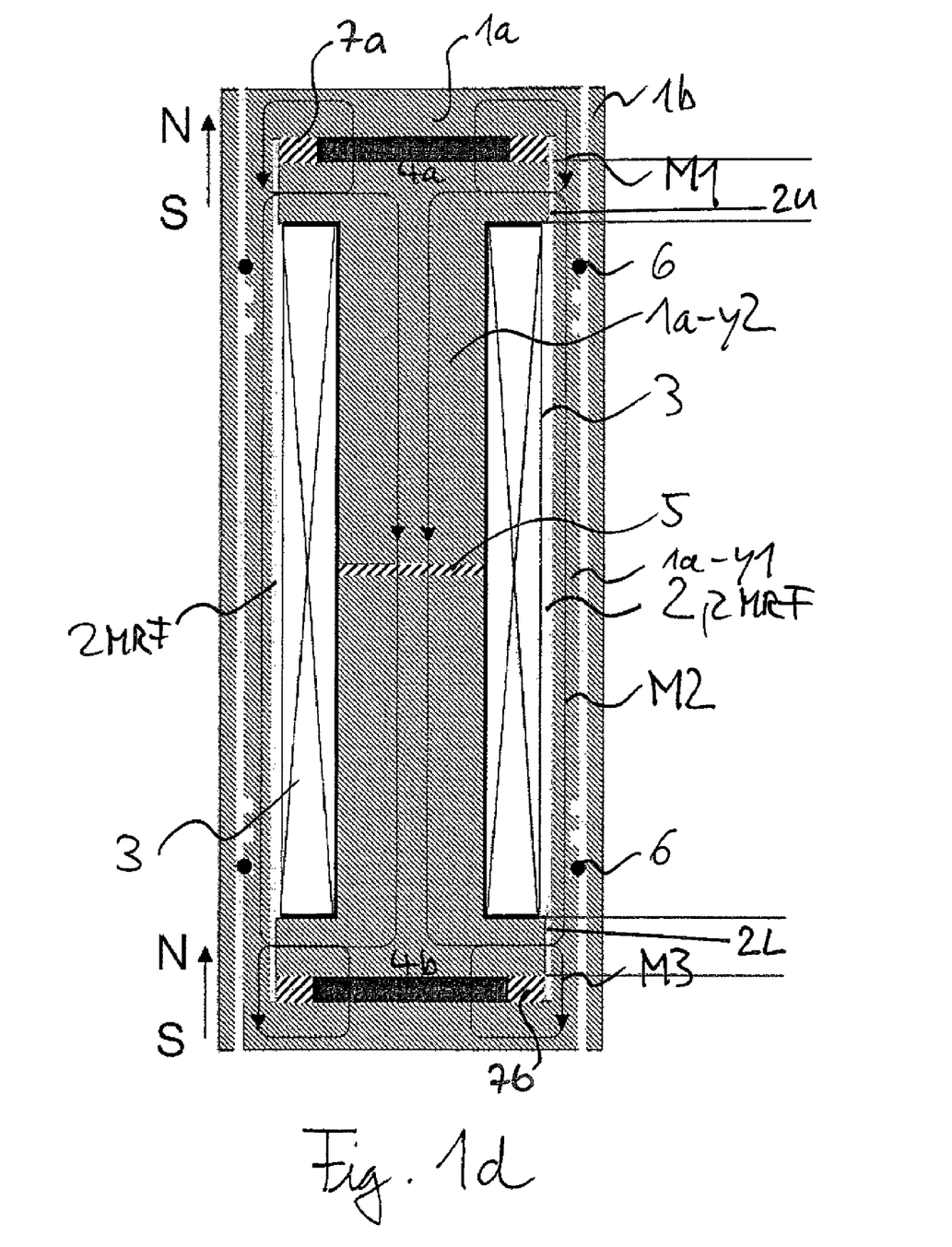
Figure 1E:
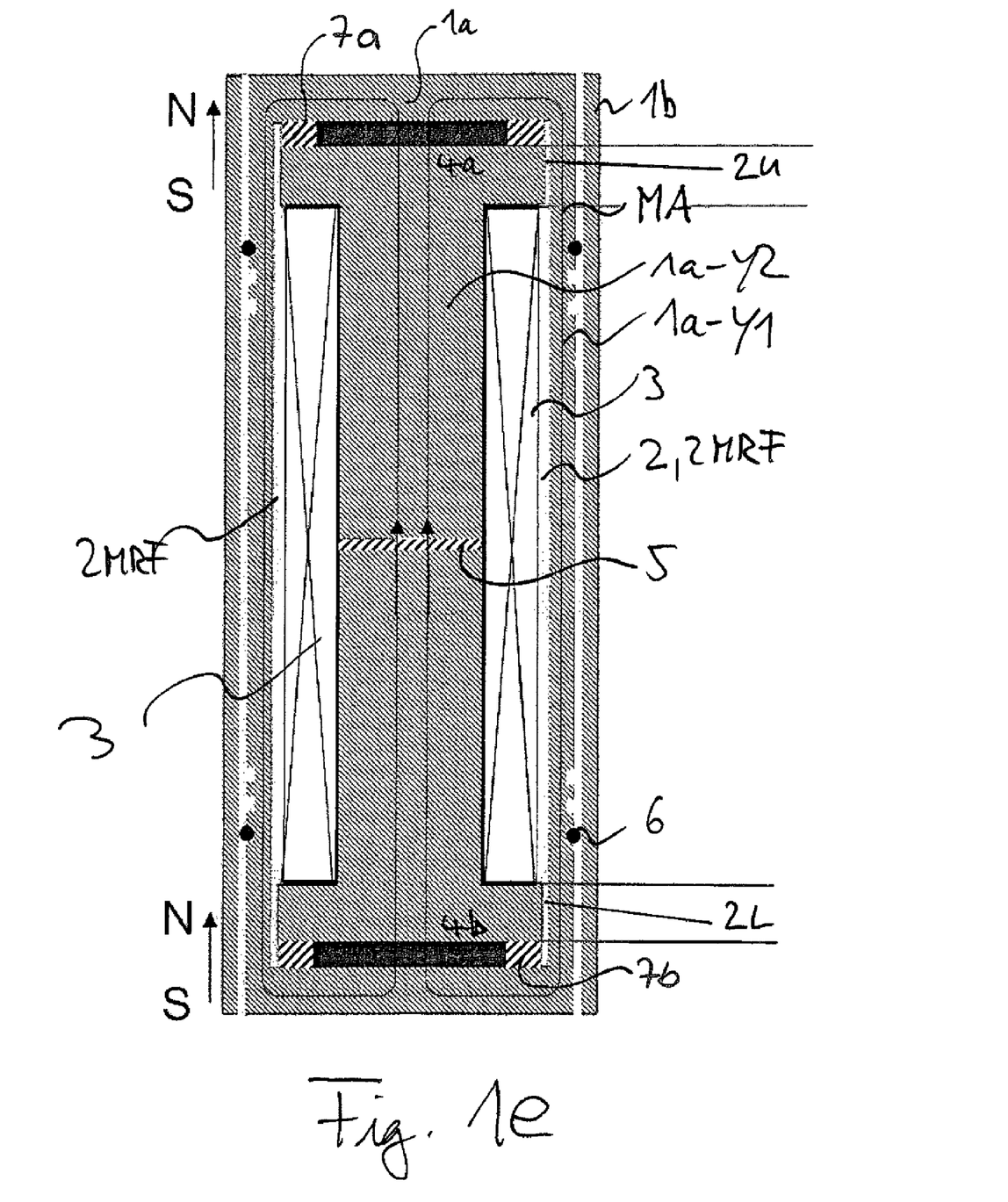

As can be seen from FIGS. 1c to 1e, all magnetic circuits generated (maximally, three magnetic circuits are generated by the two permanent magnets and the one electromagnet of the shown arrangement, see FIG. 1d) are generated in the movable inner piston 1a. The outer piston 1b (outer hull) only serves as a housing and a guidance for the inner piston 1a. The outlets 2a, 2b, 2c, ... (compare FIG. 1b) are formed as recesses in the upper or the lower yoke part of the piston 1a. Due to this shape, the magnetic circuit is barely interrupted, the magnetic flux is only compressed in the bars b formed between two adjacent recesses 2a, 2b, ....

When the inner piston 1a is moved up or down along the axis R, MRF flows through the inlets/outlets 2a, 2b, 2c, ... through both of the MRF valves and from the upper side to the lower side or from the lower side to the upper side of the inner piston 1a, respectively, thus streaming through said piston. By the shown geometry it is secured that the inlets/outlets are nearly free of a magnetic field (the flux of the MRF stream is, by increasing the diameter of the MRF gap 2 along the extension of the electromagnet 3, expanded in order to realize a higher switching factor between magnetorheological and fluid hydraulic pressure loss (ratio of the pressure losses with and without magnetic field, respectively)). The inner piston 1a is sealed with standard sealings 6 against the outer hull so that no by-pass gap results in the present case.

It is important that the two permanent magnets 4a and 4b comprise the same magnetic orientation N-S. Otherwise, when using the electromagnet (by a current flow) the magnetic flux in one active MRF gap (e.g. 2U) would be increased whereas the magnetic flux in the other active MRF gap (e.g. 2L) would be decreased so that essentially no change of the fluid resistance would result for the MRF 2MRF.

By using the permanent magnets as shown, it is possible to realize a basic shear-stress of the MRF without any electric energy input due to the electromagnet. By using the electromagnet it is then possible to attenuate the magnetic field of the permanent magnets down to nearly zero thus that in an extreme case only the fluid hydraulic features of the MRF without magnetic field are relevant. On the other hand, it is possible to increase the field of the permanent magnets thus that very high shear-stress values can be attained. Due to the basic shear-stress set with help of the permanent magnets, a fail-safe behavior of the shown device can be secured.

FIG. 1c shows the first magnetic circuit (magnetic flux lines M1) of the present system which comprises the permanent magnet 4a, the magnetic isolator 7a, the part of the MRF gap 2 corresponding to the upper part magnetic valve 2U and the parts of the inner yoke part 1a-y2 and of the outer yoke part 1a-y1 as well as the part of the upper lid of the inner piston 1a, which surround said elements 4a, 7a. Also shown is the third magnetic circuit (magnetic flux lines M3) which comprises the corresponding parts at the lower end of the piston 1a: Elements 4b and 7b as well as the parts of the elements 1a-y2, 1a-y1 and of the lower lid of the piston 1a which surround the elements 4a, 7b.

As can be seen from FIG. 1c, both permanent magnets 4a, 4b close their magnetic flux lines exclusively through the MRF gap 2 (in the area of the active parts 2U, 2L). To secure this, the inner yoke part 1a-y2 is interrupted with the magnetic-field-balancing insert 5. By selecting an appropriate thickness of this element 5 (in direction along the axis R), the magnetic field strength which can be attained within the MRF valves 2U and 2L can be adjusted. At the same time, however, also the field strength resulting due to the attenuation or the increase with help of the electromagnet 3 changes.

In addition to the first and the third magnetic circuit M1, M3 shown in FIG. 1c, FIG. 1d also shows the central magnetic circuit, the second magnetic circuit (magnetic field flux lines M2) which comprises the electromagnet 3, the magnetic-field-balancing insert 5 and those parts of the inner yoke part 1a-y2, of the outer yoke part 1a-y1 and of the MRF gap 2 surrounding these elements 5 and 3. In FIG. 1d the current flowing through the electromagnet coil is selected thus that the electromagnet 3 is operated in an increasing manner with respect to the two permanent magnets, which means that the magnetic fields generated by the permanent magnets and by the electromagnet are increasing each other in the MRF valves.

In contrast to this, in FIG. 1e, the direction of the current flowing through the electromagnet 3 is selected thus that the electromagnet 3 is operated in an attenuating manner with respect to the two permanent magnets 4a, 4b. This means that the magnetic flux of the electromagnet presses the flux of the permanent magnets out of the MRF valves and consequently the magnetic flux of the system is closed within one magnetic circuit (magnetic flux lines MA) over the elements 3, 4a, 4b, 5, 7a, 7b over the outer yoke.

With help of the additional magnetic isolators 7a, 7b arranged on the outer periphery of the permanent magnets 4a, 4b, a nearly complete compensation of the magnetic field within the MRF valves is possible because the magnetic flux will be distributed within the MRF valves nearly in a homogenous manner. In the attenuating operation shown, nearly no magnetic flux remains within the MRF gap 2 including the active MRF gaps, and the field of the permanent magnets can be nearly completely compensated in a homogenous manner.

Figure 2A:
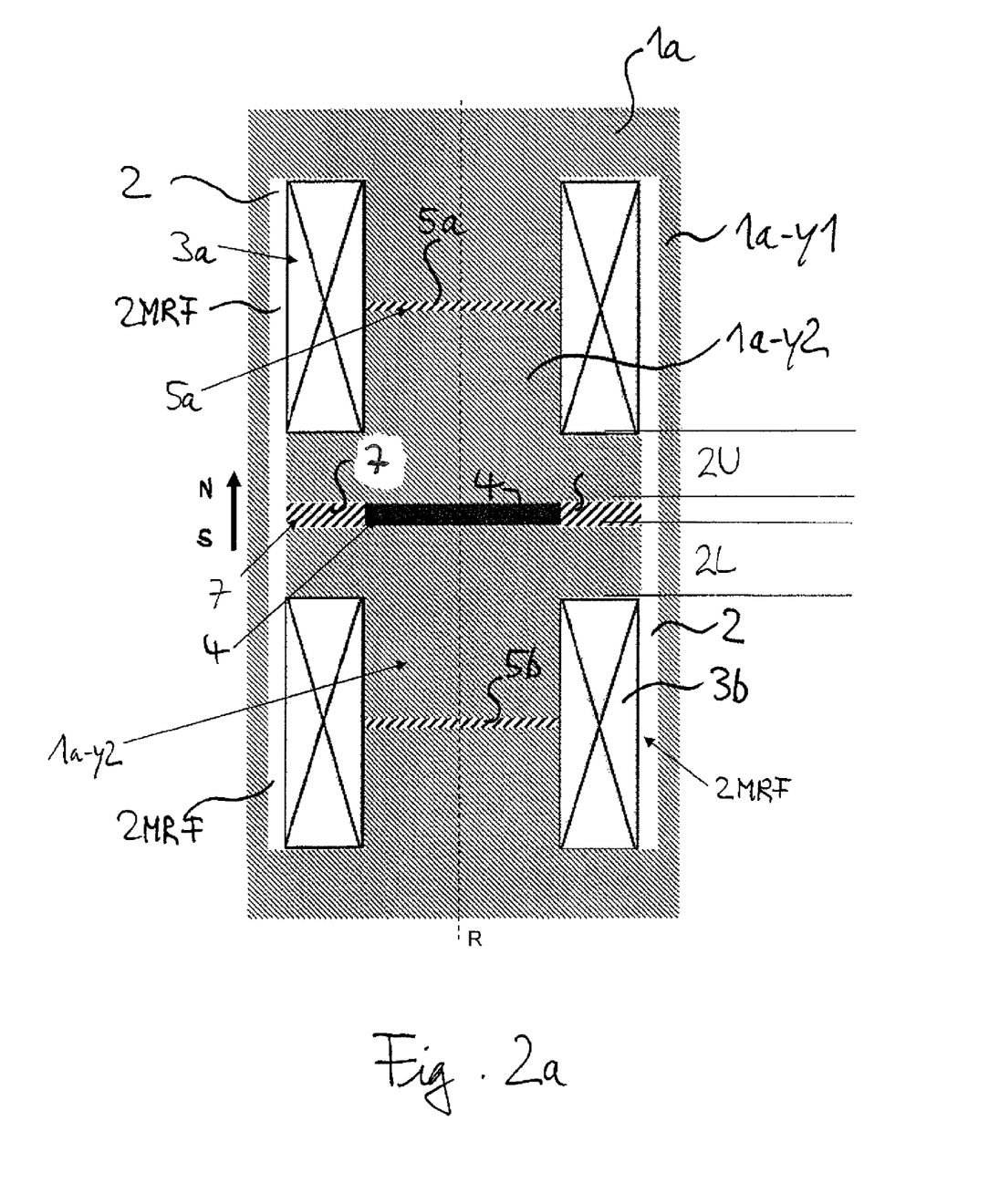
FIGS. 2a to 2d illustrate various views of a second embodiment of the present invention.

FIGS. 2a to 2d show a second example of the present invention. Therein, only an inner piston 1a of the arrangement is shown. The inner piston 1a with all the elements it comprises is generally arranged, formed and built as is the inner piston of the first embodiment (compare description of the first embodiment) so that only the differences are described in the following sections:

In contrast to the first embodiment, the second embodiment comprises one permanent magnet 4 arranged centrally (instead of or at the place of the electromagnet 3 of the first embodiment). This permanent magnet centrally arranged along the axis R is surrounded by a magnetic isolator 7 in form of a flat ring, which separates the inner yoke part 1a-y2 of the shown arrangement completely in an upper part and a lower part wherein, as subsequently described, in each part, one electromagnet is arranged.

Further, in the second embodiment shown, the first and the second permanent magnets 4a, 4b of the first embodiment are replaced by electromagnets 3a and 3b and, instead of providing on the outer periphery of the magnets magnetic isolators, magnetic-field-balancing inserts 5a, 5b, the non-magnetic inserts are provided extending along and over the whole diameter of the inner periphery of the electromagnets 3a, 3b.

Thus, either the one permanent magnet can be sandwiched in-between the two electromagnets or the one electromagnet can be sandwiched in-between the two permanent magnets.

In this case the two MRF valves 2U and 2L are formed in the area of the central section along the axis R of the shown arrangement. Thus, the second magnetic circuit is generated with help of the permanent magnet (see FIG. 2b) with the magnetic flux lines M2, whereas the first and the third magnetic circuits (with the magnetic flux lines M1 and M3) are generated by the first and the second electromagnet 3a, 3b together with their corresponding magnetic-field-balancing inserts, respectively (see FIG. 2c).

Figure 2B:
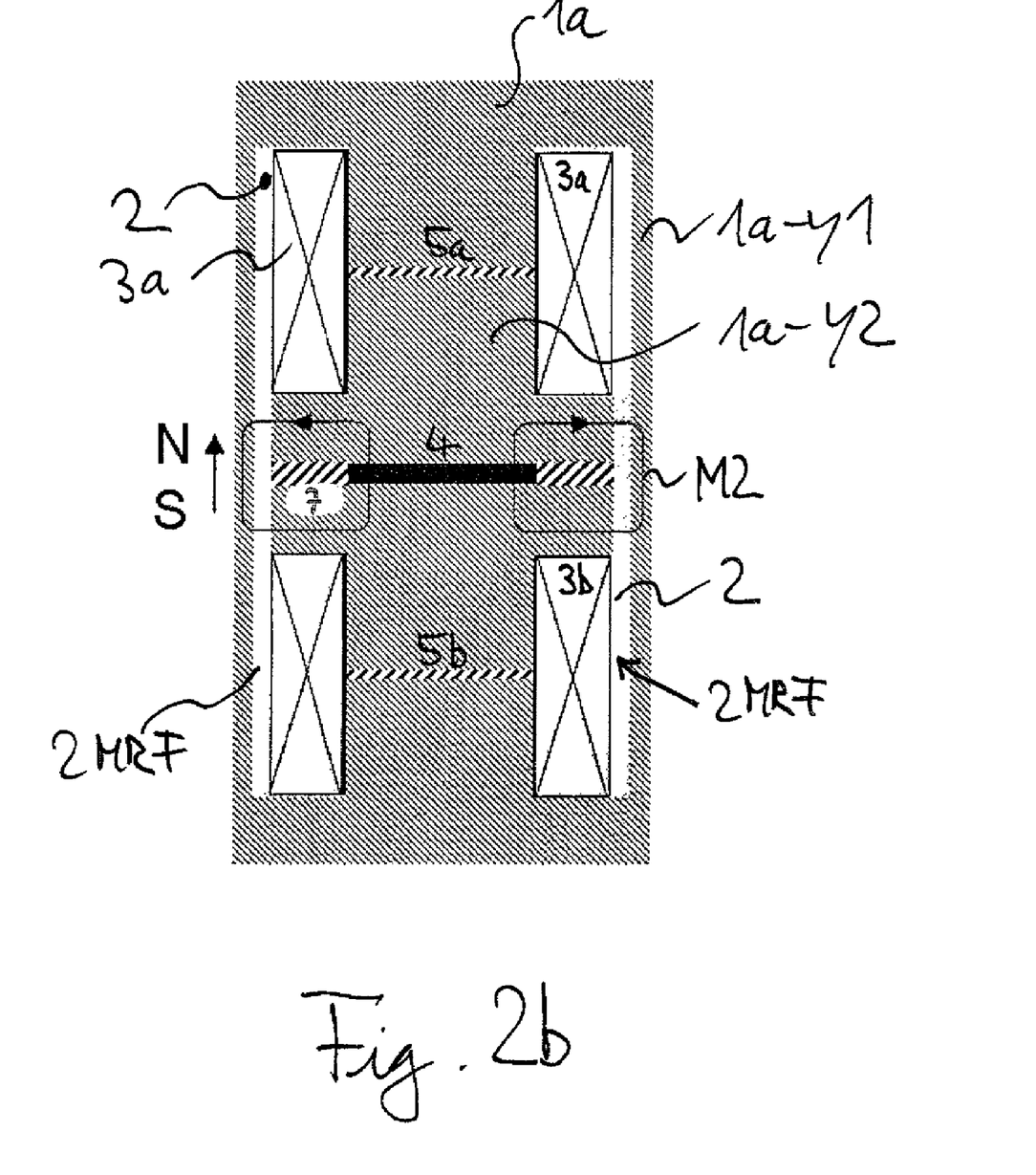

FIG. 2b shows the operation mode when only the permanent magnet is operated. The permanent magnet closes its magnetic flux lines over the two MRF valves arranged in the center of the arrangement. The two magnetic-field-balancing inserts 5a and 5b arranged in the center of the two electromagnets 3a and 3b prevent the magnetic flux of the permanent magnet to be closed over the complete outer yoke part 1a-y1.

Figure 2C:
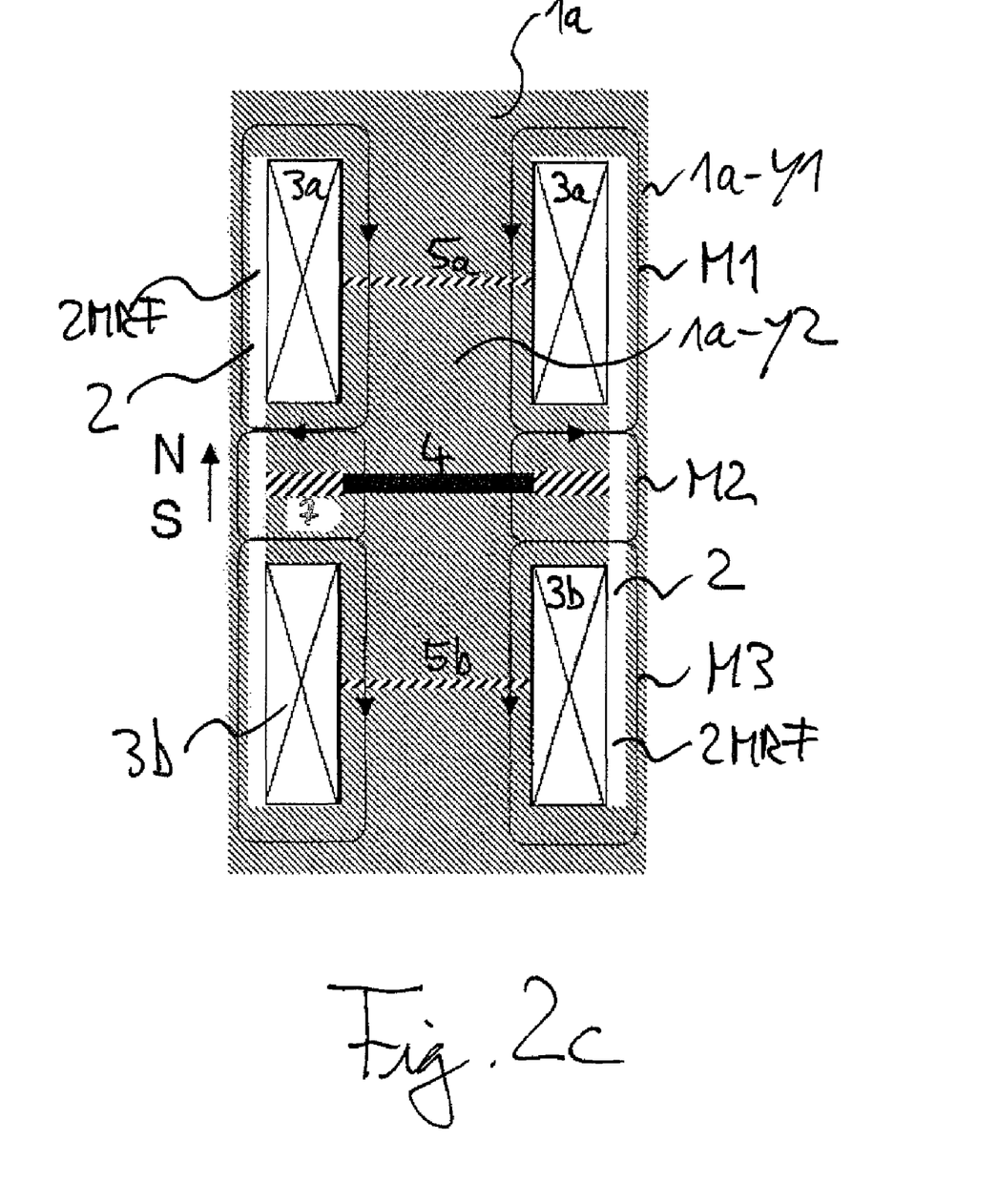

FIG. 2c shows the operation mode when the current flowing through the electromagnets 3a and 3b is selected thus (see description with respect to embodiment 1) that the magnetic fields of the permanent magnet and the electromagnets are increased within the MRF gap 2 (operation mode of increasing the magnetic flux within the MRF gap 2). Both of the coils of the electromagnets 3 then have to have the same polarity, only then both MRF valves are passed by the magnetic fluxes in the direction of an increase.

Figure 2D:
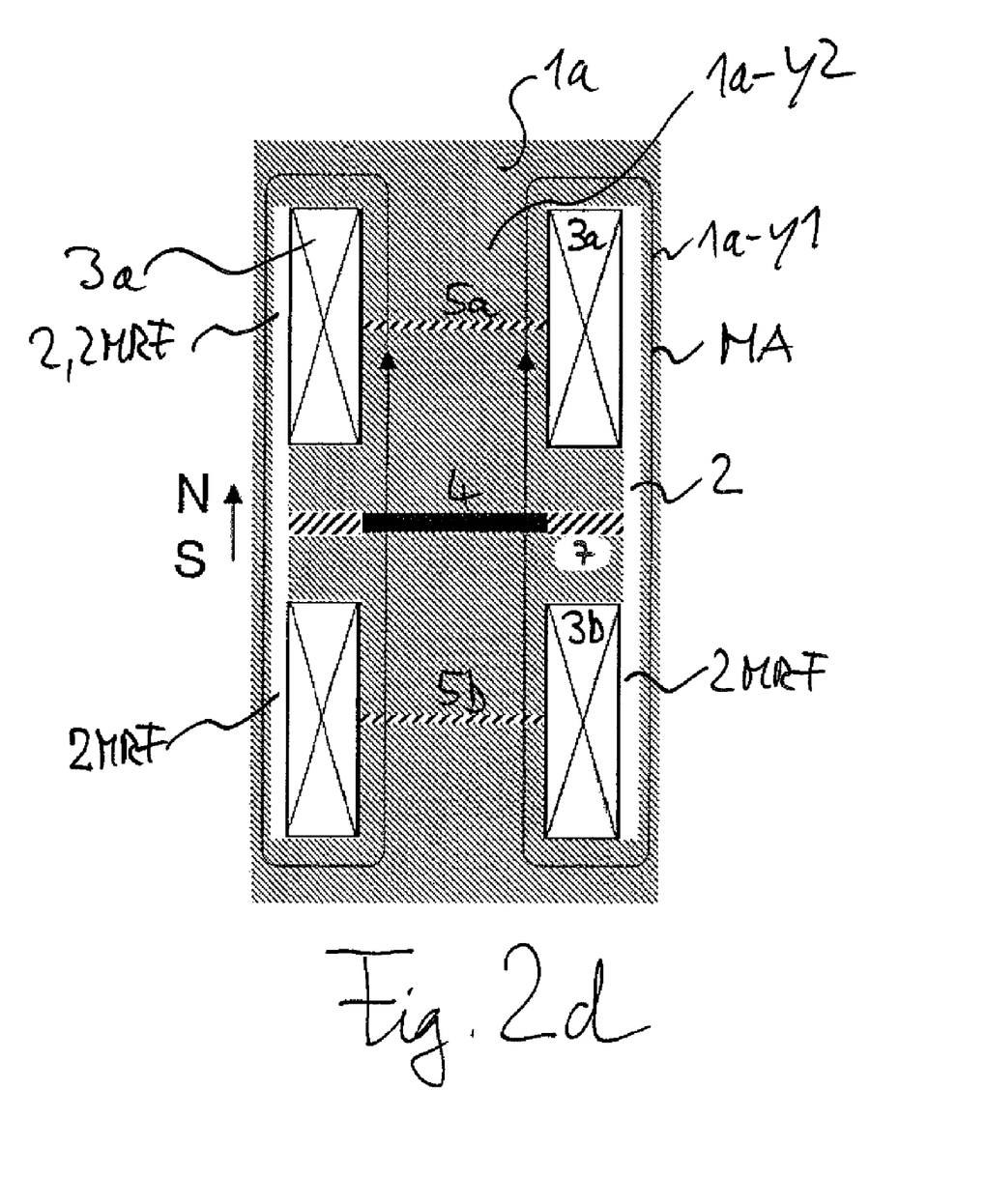

FIG. 2d shows the second embodiment in the operation mode of the magnetic field attenuation: The polarity (i.e. the current direction) of both of the electromagnets 3a and 3b is now reversed, consequently, the magnetic flux is pressed out of the region of the MRF valves and so the magnetic flux of the whole arrangement closes over the whole extension of the outer yoke part 1a-y1 (e.g. comprises, as within the first embodiment, all elements 3a, 3b, 4, 5a, 5b, 7, see the magnetic flux lines MA).

Consequently, one essential gist of the present invention is that within the magnetic circuit system of the yoke circuit of the arrangement shown, magnetic-field-weakening inserts, especially magnetic-field-balancing inserts and/or magnetic isolators, are used. The corresponding insert used as the interruption of the central yoke part provides the following in the present invention: As both of the permanent magnets in embodiment 1 have the same magnetic orientation, these two permanent magnets would provide a magnetic short-circuit over the yoke without guiding the magnetic flux through the MRF gap 2 without providing said magnetic-field-weakening insert. The thus realized interruption consequently adjusts the "basic flux density" which the permanent magnets generate without any current of the coil of the electromagnet. Therein, it is important that the magnetic-field-balancing insert comprises the same area as the area superposed within the inner or the outer yoke part of the electromagnet, i.e. the flux of the magnetic field lines of the electromagnet, has to pass completely through said magnetic-field-weakening insert.

The shown arrangements result in the following crucial advantage of the present invention: The magnetic flux lines of each permanent magnet (embodiment 1) penetrate only the area of one MRF valve. This also leads to the increased magnetic field strength in summation. With help of the very small and optimally adapted magnetic isolator 7 in the central area of the yoke within the electromagnet (embodiment 1) nearly a complete attenuation of the magnetic field is possible. On the other hand, also a large increase of the magnetic field within the MRF valves is possible. is possible.

In the specific advantageous embodiments of present invention shown above, each element which generates a magnetic field (together with the corresponding magnetic circuit) comprises at least one magnetic-field-balancing insert and/or one magnetic isolator. The insert of the electromagnet (embodiment 1) is arranged thus that each magnetic field line of the electromagnet passes through this insert. The inserts of the two outer permanent magnets (embodiment 1) are arranged thus that each magnetic field line of a corresponding permanent magnet completely surrounds said insert in a closed manner.

The invention claimed is:

1. Magnetorheological force transmission device, comprising:
    two solid body parts operable to be moved in a substantially translational manner against each other, and
    an MRF gap, which is at least partially filled with a magnetorheological material (2MRF), the MRF gap being arranged at least one of: (i) at least partially inside one of the two parts, (ii) at least partially inside both of the two parts, and (iii) at least partially in-between the two parts, and
    a magnetic circuit system operating to generate a magnetic flux within at least part of the MRF gap, the magnetic circuit system including: (i) at least one electromagnet each having at least one coil, (ii) at least one permanent magnet, and (iii) at least one of a magnetic-field-balancing insert and a magnetic isolator,
    wherein the at least one electromagnet is operable to produce a varying portion of the magnetic flux, and the at least one permanent magnet is operable to produce a fixed portion of the magnetic flux,
    wherein the magnetic flux exhibits a magnetic base field within the at least part of the MRF gap and acting upon the magnetorheological material (2MRF) therein, when there is no current flowing through the coil of the at least one electromagnet, and
    the varying portion of the magnetic flux is variable and additive to the magnetic base field when a varying current is flowing through the coil in a first direction, and is variable and subtractive to the magnetic base field when a variable current is flowing through the coil in a second, opposite direction.

2. Magnetorheological force transmission device according to claim 1, wherein the magnetic circuit system comprises two permanent magnets together with one electromagnet or two electromagnets together with one permanent magnet.

3. Magnetorheological force transmission device according to claim 2, wherein:
    the magnetic circuit system of the magnetorheological force transmission device comprises at least three magnetic circuits (first, second and third magnetic circuit), and
    one of: (i) the first permanent magnet is disposed in the first magnetic circuit, the second permanent magnet is disposed in the third magnetic circuit and the electromagnet is disposed in the second magnetic circuit, and (ii) the first electromagnet is disposed in the first magnetic circuit, the second electromagnet is disposed in the third magnetic circuit and the permanent magnet is disposed in the second magnetic circuit.

4. Magnetorheological force transmission device according to claim 3, wherein the second magnetic circuit is disposed in a sandwiched manner in-between the first and the third magnetic circuits.

5. Magnetorheological force transmission device according to claim 2, wherein either the two electromagnets and the one permanent magnet or the two permanent magnets and the one electromagnet are disposed in a displaced manner along one line (R), wherein at least one of the electromagnets and/or at least one of the permanent magnets is either arranged centrically, in the shape of a disk, on said line or concentrically, in the shape of a hollow-cylinder, a torus or a circular ring, around said line.

6. Magnetorheological force transmission device according to claim 1, wherein at least one of: at least one of the electromagnets, at least one of the permanent magnets, at least one of the magnetic-field-balancing inserts, at least one of the magnetic isolators, and the MRF gap is located at least one of: inside and in an adjoining manner to one of the two parts.

7. Magnetorheological force transmission device according to claim 1, wherein:
    the two parts comprise two pistons concentrically arranged one into the other, and
    the two parts are adapted to be moved one relative to the other in a translational manner along a common longitudinal axis.

8. Magnetorheological force transmission device according to claim 1, wherein the magnetic circuit system of the magnetorheological force transmission device comprises at least two magnetic circuits (first and second magnetic circuit), wherein the electromagnet is disposed in one of said magnetic circuits and the permanent magnet is disposed in the other of said magnetic circuits.

9. Magnetorheological force transmission device according to claim 1, wherein at least one of: at least one of the electromagnets, at least one of the permanent magnets, at least one of the magnetic-field-balancing inserts, and at least one of the magnetic isolators is disposed such that: (i) the variable magnetic flux generated by the at least one electromagnet flows through a first magnetic circuit and not through the at least one permanent magnet, and (ii) the fixed magnetic flux generated by the at least one permanent magnet flows through a second magnetic circuit other than the first magnetic circuit and not through the at least one electromagnet.

10. Magnetorheological force transmission device according to claim 1, wherein at least one of the electromagnets is arranged in a magnetic circuit without any permanent magnet and at least one of the permanent magnets is arranged in a magnetic circuit without any electromagnet.

11. Magnetorheological force transmission device according to claim 1, wherein there is no magnetic circuit in which both an electromagnet as well as a permanent magnet are arranged.

12. Magnetorheological force transmission device according to claim 1, wherein at least one of the permanent magnets is disposed such that the fixed magnetic flux caused by the permanent magnet exclusively flows through at least part of one MRF gap and each of the permanent magnets is disposed such that the respective fixed magnetic flux from each permanent magnet exclusively flows through at least a respective part of one MRF gap through which none of the fixed magnetic fluxes of the other permanent magnets flows.

13. Magnetorheological force transmission device according to claim 1, wherein the MRF gap is arranged at least partially in-between the two solid body parts and either the two solid body parts are adapted to be moved one relative to the other in a substantially shearing manner or the two solid body parts are adapted to be moved one relative to the other in a substantially squeezing manner.

14. Magnetorheological force transmission device according to claim 1, comprising plural MRF gaps, wherein at least two of the plural MRF gaps are arranged essentially parallel one to the other, and wherein at least two of the plural MRF gaps comprise an interconnection.

15. Magnetorheological force transmission device according to claim 1, wherein at least one of: at least one of the magnetic-field-balancing inserts and at least one of the magnetic isolators is an insert comprising one or more non-magnetic materials, a three dimensional solid state body, an air-filled volume, a diamagnetic material, or a ferromagnetic material with a relative magnetic permeability $\mu_r$ of smaller than 10.

16. Magnetorheological force transmission device according to claim 1, wherein at least one of:
at least one of: at least one of the magnetic-field-balancing inserts and at least one of the magnetic isolators is arranged concentrically within one of the electromagnets, or within one of the permanent magnets, and
at least one of: at least one of the magnetic-field-balancing inserts and at least one of the magnetic isolators is arranged concentrically around the outer periphery of one of the electromagnets or around one of the permanent magnets.

17. Magnetorheological force transmission device according to claim 1, wherein at least one of the permanent magnets comprises at least one of the following magnetically-hard materials: NdFeB, an alloy comprising Sm and Co, $SmCo_2$, an alloy comprising Al, Ni and Co, AlNiCo, and ferrite.

18. Magnetorheological force transmission device according to claim 1, wherein the magnetorheological material (2MRF) comprises at least one of a magnetorheological fluid, a magnetorheological foam, a magnetorheological gel and a magnetorheological elastomer.

19. Magnetorheological force transmission device according to claim 1, wherein the device is one of a vibration damper, a shock absorber, a locking device, a blocking device, a safety switch, a haptic device or a man-machine interface.

20. Vibration damper, shock absorber, locking device, blocking device, safety switch, haptic device or man-machine interface, comprising a magnetorheological force transmission device according to claim 1.

21. Use of a magnetorheological force transmission device according to claim 1 as vibration damper, shock absorber, locking device, blocking device, safety switch, haptic device or man-machine interface.

22. Magnetorheological force transmission method, comprising:
providing two solid body parts operable to be moved in a substantially translational manner against each other,
at least partially filling an MRF gap with a magnetorheological material (2MRF), the MRF gap being arranged at least one of: (i) at least partially inside one of the two parts, (ii) at least partially inside both of the two parts, and (iii) at least partially in-between the two parts,
moving the two parts in a substantially translational manner against each other,
generating a magnetic flux within the MRF gap with a magnetic circuit system including: (i) at least one electromagnet each having at least one coil, (ii) at least one permanent magnet, and (iii) at least one of a magnetic-field-balancing insert and/or a magnetic isolator,
producing a varying portion of the magnetic flux using the at least one electromagnet,
producing a fixed portion of the magnetic flux using the at least one permanent magnet, wherein the magnetic flux exhibits a magnetic base field within the at least part of the MRF gap and acting upon the magnetorheological material (2MRF) therein, when there is no current flowing through the coil of the at least one electromagnet, and
adding the varying portion of the magnetic flux to the magnetic base field using a variable current flowing through the coil in a first direction, or subtracting the varying portion of the magnetic flux from the magnetic base field using a variable current flowing through the coil in a second, opposite direction.

\* \* \* \* \*